United States Patent
Kekki

(10) Patent No.: US 7,508,758 B1
(45) Date of Patent: Mar. 24, 2009

(54) METHOD AND SYSTEM TO TRANSMIT AND/OR RECEIVE INFORMATION BETWEEN NETWORK ELEMENTS

(75) Inventor: Sami Kekki, Helsinki (FI)

(73) Assignee: Nokia Corporation, Espoo (FI)

( * ) Notice: Subject to any disclaimer, the term of this patent is extended or adjusted under 35 U.S.C. 154(b) by 833 days.

(21) Appl. No.: 10/297,470

(22) PCT Filed: Jun. 9, 2000

(86) PCT No.: PCT/EP00/05365

§ 371 (c)(1),
(2), (4) Date: Aug. 13, 2003

(87) PCT Pub. No.: WO01/95574

PCT Pub. Date: Dec. 13, 2001

(51) Int. Cl.
*H04J 1/16* (2006.01)
*H04L 12/28* (2006.01)

(52) U.S. Cl. .................. 370/230; 370/235; 370/412; 370/428

(58) Field of Classification Search ................ 370/230, 370/232, 235, 412, 413, 428, 429, 236, 414, 370/398, 231, 230.1, 229
See application file for complete search history.

(56) References Cited

U.S. PATENT DOCUMENTS

| | | | | |
|---|---|---|---|---|
| 5,418,781 A * | 5/1995 | Kaufman et al. | ............ | 370/413 |
| 5,689,500 A * | 11/1997 | Chiussi et al. | ............. | 370/235 |
| 5,774,453 A | 6/1998 | Fukano et al. | ............. | 370/231 |
| 5,787,073 A * | 7/1998 | Ikeda | ......................... | 370/236 |
| 6,122,251 A * | 9/2000 | Shinohara | .................... | 370/231 |
| 6,252,849 B1 * | 6/2001 | Rom et al. | .................. | 370/230 |
| 6,430,187 B1 * | 8/2002 | Park | .......................... | 370/397 |
| 6,490,248 B1 * | 12/2002 | Shimojo | .................... | 370/229 |
| 6,633,564 B1 * | 10/2003 | Steer et al. | .................... | 370/389 |
| 6,711,126 B1 * | 3/2004 | Besset-Bathias | ........... | 370/229 |
| 6,785,238 B1 * | 8/2004 | Kago | ...................... | 370/236.1 |
| 7,002,911 B1 * | 2/2006 | Linville et al. | ............. | 370/230 |
| 7,145,868 B2 * | 12/2006 | Giroux et al. | .............. | 370/229 |
| 2002/0167955 A1 * | 11/2002 | Shimojo | .................... | 370/411 |

FOREIGN PATENT DOCUMENTS

| EP | 0 678 996 | 2/1995 |
|---|---|---|
| WO | 99/3317 | 7/1999 |

* cited by examiner

*Primary Examiner*—Wing F Chan
*Assistant Examiner*—Hicham B Foud
(74) *Attorney, Agent, or Firm*—Squire, Sanders & Dempsey, L.L.P.

(57) ABSTRACT

The invention proposes a method and system for transmitting information in a network. The network includes at least one buffer unit for buffering the information to be transmitted. The buffer unit includes one or more first and second buffer stages. The information to be transmitted is buffered in one of the first buffer stages and then transferred to the second buffer stage from which it is transmitted to another network element. The first buffer stage is adapted to receive control data from the second buffer stage which control data influences the transferring of subsequent information from the first to the second buffer stage. Thereby, the necessary maximum buffer capacity of the second buffer stage can be kept small without danger of data loss caused by overflow. Moreover, the transmission delay caused by the second buffer stage can be reduced.

21 Claims, 2 Drawing Sheets

METHOD AND SYSTEM TO TRANSMIT AND/OR RECEIVE INFORMATION BETWEEN NETWORK ELEMENTS

FIELD OF THE INVENTION

The invention relates to a system, in particular to an information transmission system such as a communication system or network, which comprises two or more network elements which can transmit and/or receive information to or from other network elements. The information may be of any kind such as voice, data, audio or video signals etc. The information may be transmitted in any suitable form such as packets which can e.g. be ATM-transmitted (ATM=Asynchronous Transfer Mode) and the like.

BACKGROUND OF THE INVENTION

Generally, information can be transmitted over a communication network according to several different methods such as a circuit-switched connection or packet-switched scheme. When using a packet-switched transmission, the information to be transmitted is usually segmented into packets which are transmitted to the terminating or any intermediate network entity. The information elements to be transmitted, such as messages, data, packets and the like, may be temporarily buffered in a transmit buffer which outputs the information elements to the network in accordance with appropriate conditions such as flow rate and the like.

When a high amount of information elements is to be transmitted using a transmit buffer, there is a certain probability of loss of information elements when the transmit buffer reaches a filling or overflow condition. When trying to relieve this problem by increasing the buffer capacity, the hardware requirements are disadvantageously increased, and the delay between inputting of information elements into the transmit buffer, and output thereof is significantly increased. The resulting delay may in some cases be too high for real-time traffic such as voice data transmission.

SUMMARY OF THE INVENTION

The invention aims at providing a system and method which are able to contribute to efficient transmission of information elements such as packets.

The invention provides, according to one aspect, an information transmission system comprising network elements adapted to transmit or receive information to or from other network elements, and at least one buffer means for buffering the information, wherein the buffer means comprises at least a first and a second buffer stage, the information to be transmitted being buffered in the first buffer stage and then transferred to the second buffer stage from which it is transmitted to another network element. The first buffer stage is adapted to receive control data from the second buffer stage which control data influences the transferring of subsequent information from the first to the second buffer stage.

Such a system, e.g. communication system, may be part of a network, e.g. a data network or communication network, or may consist of one or more networks.

Two or more first buffer stages may be provided which cooperate with one or more second buffer stages, at least one of the first buffer stages being adapted to transmit control data to, or receive control information from, one or more of the other first buffer stages, said control information representing information on, or controlling, the actual or intended information transferal from the respective first buffer stage(s) to the second buffer stage.

Preferably, the information is transmitted as data packets. The information may be transmitted from the second buffer stage using an ATM-VCC which is commonly used by several channels. The channels preferably are AAL2 channels. The system may comprise a segmentation and reassembly control means which cooperates with the first buffer stage(s) for segmentation and reassembly of information elements.

The invention furthermore provides, according to another aspect, a method for transmitting information in a system such as described above, wherein the information to be transmitted is buffered in a first buffer stage and then transferred to a second buffer stage from which it is transmitted to another network element. The first buffer stage is adapted to receive control data from the second buffer stage which control data influences the transferring of subsequent information from the first to the second buffer stage.

Moreover, according to a further aspect of the invention, a network element is provided which comprises a first buffer, information to be transmitted being buffered in the first buffer for transmission to a second buffer, and means for receiving control information from the second buffer, the control information influencing the transmission of subsequent information from the first to the second buffer.

The control data or control information may e.g. be sent from the second buffer (stage) to the first buffer (stage). According to the invention, a buffering scheme is provided which preferably includes two or more buffer stages. As an example, a two-stage buffering scheme may be provided. The data of one or more channels may be buffered in a connection-specific (logical) buffer which forms part of the first buffering stage. Thereafter, the data buffered in the first buffer stage may be delivered to the second buffer stage which may be shared, i.e. commonly used by all channels using the same connection.

According to a preferred embodiment of the invention, a feed-back is provided between the two buffering stages. This enables an efficient usage of transport resources within the network(s), and thus provides an advantageous transport solution. A statistical multiplexing may be provided in the second buffer stage which contributes to transport efficiency. Furthermore, the achievable statistical multiplexing gain can be enhanced taking account of the capabilities of the multiplexing stages of the first buffer stage(s), for instance of the ATM Adaption Layer 2 (AAL2). The multiplex stage thus has additional intelligence improving the overall transport efficiency.

In particular, when transmitting information in form of packets, these packets may easily be input into, and output from the second buffer stage for transmitting them to their destination or any intermediate network component.

The first buffer stage may be provided for segmentation and re-assembly of the information elements so as to generate packets suitable for connection to the network.

When using the proposed structure and method, the capacity of the second buffer stage can be kept in a reasonable range without danger of overload which otherwise might possibly result in data loss.

Moreover, the transmission delay occurring in the second buffer stage can be kept at an acceptable small level. This is in particular due to the achievable small second buffer capacity which leads to a correspondingly small average delay between input and output of information elements.

DETAILED DESCRIPTION OF PREFERRED EMBODIMENTS OF THE INVENTION

Figure 1:
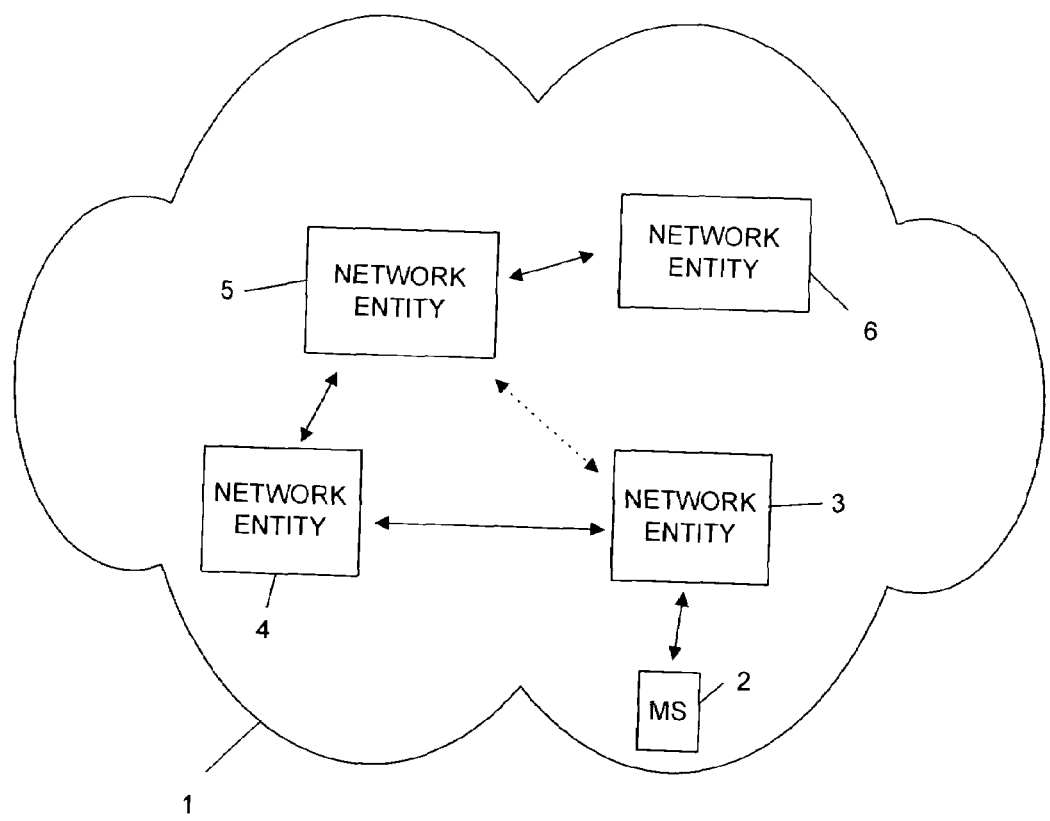
FIG. 1 shows a schematic representation of a network representing or incorporating an embodiment of the invention.

FIG. 1 shows a basic structure of a network 1 representing an embodiment of a connection system according to the invention.

The network 1 may be implemented as an UTRAN Network, a UMTS (Universal Mobile Telecommunications System), GPRS (General Packet Radio Service) network, GSM (Global System for Mobile Telecommunication) or any other type of network. The network 1 preferably is a packet-switched network in which the information is transmitted in form of packets.

The network 1 comprises several network entities (from two to several thousands or more network elements) 2 to 6 which may comprise or consist of mobile stations (MS) 2, serving nodes, e.g. Serving GPRS Support Nodes (SGSN) 3, 4, one or more gateway nodes 5 such as GGSN (Gateway GPRS support node) and one or more databases 6 such as HLR (Home Location Register) and VLR (Visitor Location Register). Generally, the structure, functioning and interaction of the network entities 2 to 6 is known and will therefore not be described here in more detail.

Figure 2:
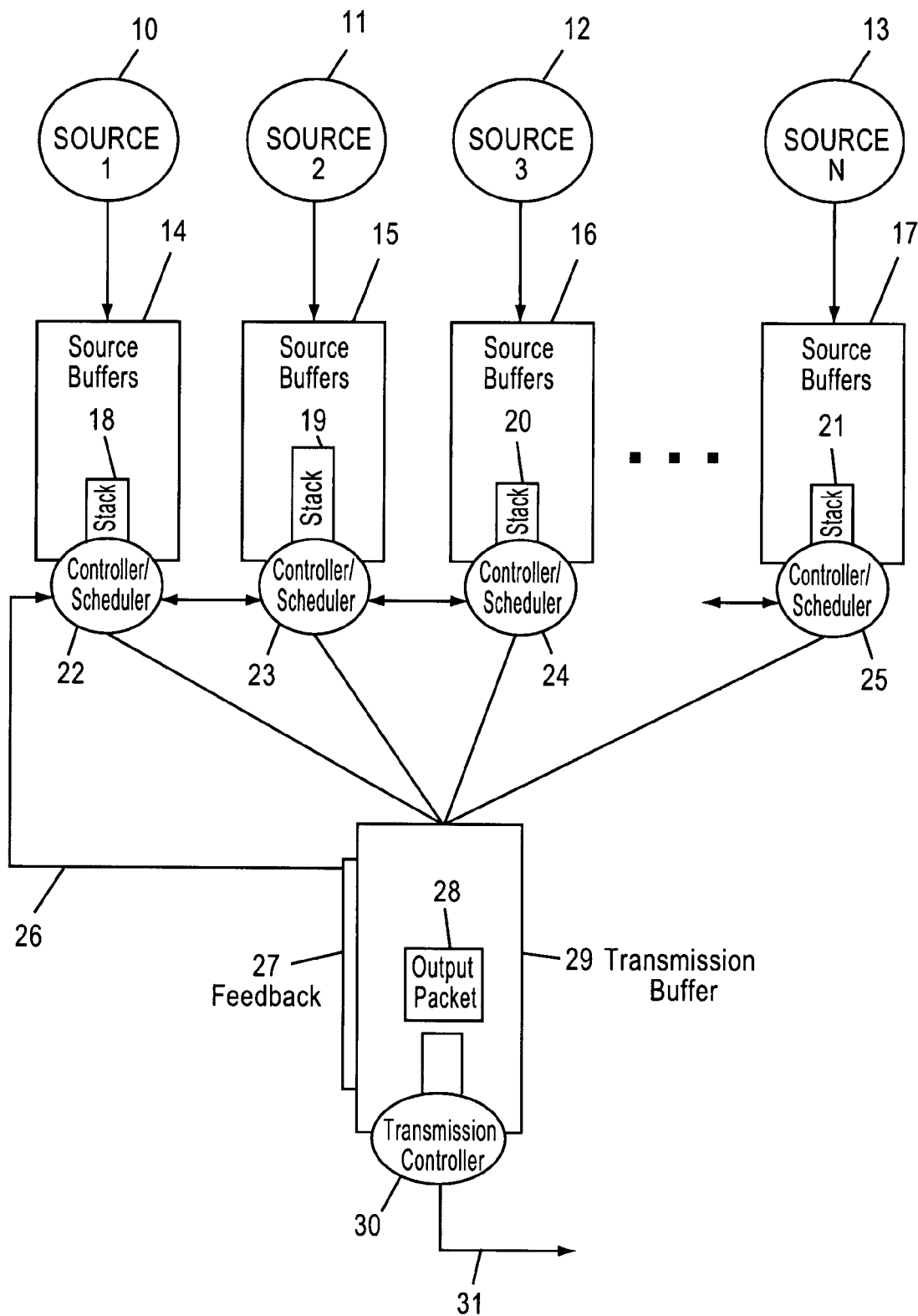
FIG. 2 shows details of an embodiment of the invention.

FIG. 2 illustrates an embodiment of a connection or communication system in accordance with the invention. The system comprises two or more (normally a plurality N of) traffic sources 10 to 13 which may correspond to the network entities 2 to 6 shown in FIG. 1. The N traffic sources 10 to 13 may e.g. consist of RLC (Radio Link Control) entities in a 3 G (third generation) WCDMA (Wideband Code Division Multiple Access) cellular system. Each source 10 to 13 has certain characteristics like transmission time interval (TTI), peak rate/max. SDU (Service Data Unit) size, average rate/average SDU size, delay requirement (e.g. real-time, non-real-time connection or information transmission), and the like. The TTI determines the inter-arrival time of two consecutive data packets. In a cellular system, the TTI is normally well-known due to e.g. radio interface characteristics (RLCP behaviour), speech-video codecs (e.g. 20 ms for Enhanced Full Rate, EFR, and Adaptive Multi-Rate, AMR), etc.

In an AAL2 (ATM Adaptation layer 2) end system, the data packets of the sources 10 to 13 are first received and buffered in connection-specific buffers 14 to 17 respectively assigned to a corresponding sources 10 to 13. These buffers 14 to 17 are used for segmentation, wherein each packet is segmented and each segment is encapsulated into its Common Part Sub-layer (CPS) packet, and for re-assembly which represents the reverse operation. The buffers 14 to 17 represent first buffer stages. A control means (not shown) assigned to the sources 10 to 13 performs this segmentation and re-assembly by accessing the associated buffer 14 to 17, reading-out the packets or segments, processing the packets or segments, and storing them back in processed manner. The buffers 14 to 17 can also be used for traffic shaping, wherein the segments of a packet are passed on with certain time intervals in order to shape a resulting burst of segments in a given connection (which may be an AAL2 connection).

The system comprises a further buffer 29 which represents a second stage buffer and is here a transmission buffer (TX buffer). The CPS packets of the individual connections, i.e. buffers 17, are assembled into ATM (Asynchronous Transfer Mode) cells in the buffer 29 using an appropriate control means. These ATM cells are sent to the transmission line (represented by reference numeral 31) according to the ATM VCC (Virtual Channel Connection) rate (cells/s).

The buffers 14 to 17 generally provide a connection-specific queuing which may be performed on the AAL2 layer. The data of each individual AAL2 channel (or possibly also of a bundle of channels) is buffered in its connection-specific (or bundle-specific) buffer 14 to 17 which may be implemented as a logical buffer by reserving appropriate capacity of e.g. M bytes. The capacity M of each buffer 10 to 17 may be individually determined per connection. The capacity M of the n-th buffer preferably is equal to or greater than the maximum length of the SDU (Service Data Unit) of the respective source.

After buffering and segmenting the packets, the data are delivered to the second buffer stage, i.e. to the buffer 29 which is an ATM-VCC-specific buffer that is commonly shared by all AAL2 channels which are using the same ATM VCC. The connection-specific first stage of buffering (buffers 14 to 17) will not only be used for segmentation and re-assembly (SAR) of the AAL2 SDUs and possibly for controlling the rate of sending the segments to the common buffer 29 (i.e. traffic shaping), but also for controlling the total information flow from the buffers 14 to 17 to the buffer 29.

When not controlling the total, i.e. simultaneous information flow from the buffers 14 to 17 to the buffer 29, a bursty arrival of segments from different connection-specific buffers 14 to 17 might occur which might result in either cell loss (overflow of transmission buffer 29), or might require an increased size of transmission buffer 29 leading to an increased transmission time delay. The transmission buffer 29 would require, in the latter case, a capacity sufficient for storing a large number of bytes, the capacity being determined by the loss and delay requirements on the one side, and the buffer serving rate R (output of ATM cells per second), on the other side. The resulting delay variation would be a function of acceptable loss rate and buffer serving rate.

The buffer 29 performs a statistical multiplexing of the CPS packets received from the individual first buffer stages 14 to 17.

In accordance with a preferred implementation of the invention, the characteristics of the individual sources 10 to 13 are taken into account (mainly the TTI) in order to optimise the necessary amount and capacity of buffers, in particular of the first buffers, vs. the performance of the system, e.g. loss rate and delay.

In the source-specific buffers 14 to 17 the control is conventionally such that, after arrival of a preceding packet, a next packet will arrive at the source-specific buffer only after the TTI period. In accordance with a preferred embodiment of the invention, the connection-specific stage, i.e. the buffers 14 to 17 are used in a more advanced way. In order to avoid a too bursty arrival of CPS packets from the different source-specific queues in the buffers 14 to 17 at the shared transmission buffer 29, a feed-back mechanism is provided between the transmission buffer and the source-specific buffers, and between the source-specific buffers 14 to 17. This enables the utilisation of the connection-specific characteristics in dimensioning of the buffers 14 to 17 and in particular of the transmission buffer 29.

The source- or connection-specific characteristics preferably include the SDU periodicity, the requirements of admissible delay (e.g. real-time; non-real-time), etc.

In more detail, as the characteristics of the traffic on a given channel such as an AAL2 channel (e.g. SDU periodicity and rate delay requirements, etc.) are known, the channel-specific buffers 14 to 17 can be used as a temporary storage for the data segments in order not to overload the common buffer, preferably an AAL 2 buffer, 29. In practice, such an overload would result in a buffer overflow and data loss.

Depending on the delay requirements of a given AAL2 user, the sending of packet(s) from the channel-specific buffers 14 to 17 can be delayed if otherwise there would occur a bursty arrival of data in the common buffer 29. The burstiness refers here to the behaviour of the aggregate of all (AAL2) channels sharing the common buffer 29. In order to be able to adapt to big bursts, the queue length of the common buffer would normally, without implementing the invention, become large and would therefore require a larger memory capacity. This effect can be overcome by the invention.

As shown in FIG. 2, each buffer 14 to 17 contains a stack 18 to 21, respectively, of packets or segments to be transmitted to the common buffer 29. The height of the stacks is different depending on the actual transmission requirements of the individual sources 10 to 13 and the intermediate buffering performed in the buffers, and may range from 0 to maximum. The shown different heights of stacks 18 to 21 represent the different amounts of information buffered in the buffers 14 to 17 for transmission to the buffer 29 and further to the recipient of the information.

The additional buffering performed in the channel-specific buffers 14 to 17 does not necessarily require any additional buffer capacity, in particular when the traffic characteristics are taken into account in the buffer management process, e.g. the SDU periodicity. The two-level buffering according to the embodiment of the invention moreover reduces the overall delay variation of all AAL2 channels because the queue length in the common buffer can be dimensioned to be smaller and yet still to meet the original loss criteria such as amount of losses caused by overflow.

According to the preferred embodiment of the invention, a feed-back information is used providing a feedback between the two stages of the buffering (preferably AAL2 buffering). This technology contributes to an efficient usage of transport resources within the network such as UTRAN and thus contributes to providing competitive transport solution. The statistical multiplexing performed in the second buffer stage not only contributes to the transport efficiency as such but also provides increased multiplexing gain depending on the capabilities of the multiplexing stages (AAL2).

Each buffer 14 to 17 co-operates with a control means 22 to 25, respectively, which may be implemented as a scheduler and controls the transmission of packets or segments from the buffers 14 to 17 to the common buffer 29 so as to avoid any overload condition of the buffer 29, and/or preferably also of one or more of the buffers 14 to 17. The buffer 29 is equipped, or co-operates, with a detecting or control means 27 detecting the filling amount of buffer 29, i.e. the number or amount of packets 28 stored in buffer 29 for output over connection 31 to the network. Similar to buffers 14 to 17, buffer 29 is equipped with or co-operates with, a control means 30 such as a scheduler controlling the output of packets 28 from buffer 29 to the network. Information detected by control means 27 is fed back, via a connection such as a line 26, to the control means 22 to 25. The control means 22 to 25 furthermore exchange information between each other regarding the individual transmission states such as actual transmission state, intended transmission, buffer filling amount, priority requirements, urgent need for transmission because of delay restrictions such as real-time traffic, and the like. This exchange of information is represented in FIG. 2 by means of double-headed arrows shown between the control means (e.g. schedulers) 22 to 25.

In the following, an example will be explained. Let us assume that the buffer 14 assigned to source 10 has received a packet from source 10. This packet is immediately segmented into CPS packets. Before any of the segments, i.e. CPS packets, is sent towards the shared transmission buffer 29, the control means 22 of the buffer 14 checks the actual situation in the transmission buffer 29 and in the other source-specific buffers 15 to 17. For this examination, the additional communication described above is provided between the involved entities such as represented by connection (e.g. line or channel) 26 and arrows between the control means 22 to 25. When the control means 22 determines that the buffer space in the transmission buffer 29 is approaching overflow, or if it recognises that one or more other source-buffer(s) 15 to 17 is already sending segments to the transmission buffer 29 which might result in an overflow of buffer 29, the control means 22 only schedules the packet transmission but postpones the actual transmission.

The buffer 14 of source 10 can safely postpone the transmission because of the knowledge of the characteristics of its source 10. For example, in case of AMR speech, the next packet will only arrive after 20 ms TTI. Another constraint besides the TTI in determining the length of possible postponement of the start of the transmission is the delay requirement of the service itself (e.g. real-time, non-real-time traffic).

The above explanations are valid for the functioning and control of the other buffers 15 to 17 and control means 23 to 25 as well.

The output rate, i.e. cell transmission rate R of the transmission buffer 29, the CAC applied and the like are properly dimensioned, in accordance with the network parameters, in known manner.

The method and structure according to the invention lead to a significant reduction of the necessary buffer space of buffer 29 as compared to a customary arrangement. Theoretically, the capacity of buffer 29 can be reduced so as to be sufficient for buffering only one ATM cell as the buffer 29 does not need to be used for absorbing bursty arrivals from the source-specific buffers 14 to 17. Such bursty arrivals which might otherwise be caused by simultaneous sending of several first stage buffers or by sending a large number of segments at once, are inhibited by the control means 22 to 25.

In a similar manner, the source-specific buffers 14 to 17 only need to be able to store the maximum size SDU (i.e. packet) as the TTI of the sources is in practice normally enough to ensure a forwarding of the segments to the transmission buffer 29 before reaching any overflow condition.

The described structure and functioning provide the benefits of buffer space optimisation while simultaneously allowing the utilisation of statistical multiplexing which results in high transport efficiency in particular with regard to the transmission line 31.

Several source-specific buffers 14 to 17 are shown in FIG. 2. Alternative embodiments of the invention may also comprise only one source-specific buffer which may be reserved for only one source, or may provide a common first-stage buffer or channel for several sources. Furthermore, two or more second-stage buffers may be provided Which cooperate with several first-stage buffers.

Although specific embodiments of the invention have been described above, the scope of the invention is intended to cover any alterations, modifications, omissions and additions to the disclosed teaching which will be apparent for a person skilled in the art.

The invention claimed is:

1. An apparatus, comprising:
    a plurality of first buffer stages configured to receive, buffer, and transfer information;
    a second buffer stage configured to accept, buffer, and transmit the transferred information to another network element; and
    a plurality of controllers, each of said controllers associated with one of the first buffer stages, wherein each of said controllers is configured to:
        cooperate with said associated one of said first buffer stages to detect a filling state of said associated one of said first buffer stages,
        cooperate with the second buffer stage or another of said controllers to detect a filling amount of the second buffer stage,
        cooperate with others of said controllers to receive data regarding a filling state of each of others of said first buffer stages, and
        generate control data,
    wherein each of the first buffer stages is configured to receive the control data from the associated one of said controllers, said control data being configured to control the transferring of the information from each of the first buffer stages to the second buffer stage so as to avoid an overload of the second buffer stage and to minimize an overload of any of the first buffer stages.

2. An apparatus according to claim 1,
    wherein the second buffer stage comprises a plurality of second buffer stages,
    wherein the controllers are configured to cooperate with each of the second buffer stages to detect the filling amount of each of the second buffer stages, and
    wherein said control data is further configured to control the transferring of the information from each of the first buffer stages to each of the second buffer stages so as to avoid the overload of any of the second buffer stages.

3. An apparatus according to claim 1, wherein each of the controllers comprises a scheduler.

4. An apparatus according to claim 1, wherein the transmitted information comprises data packets.

5. An apparatus according to claim 1, wherein the information is transmitted from the second buffer stage using an asynchronous transfer mode virtual channel connection which is commonly used by several channels.

6. An apparatus according to claim 5, wherein the channels comprise asynchronous transfer mode adaptation layer protocol type-two channels.

7. An apparatus according to claim 1, comprising a segmentation and reassembly controller configured to cooperate with the first buffer stages for segmentation and reassembly of information elements.

8. An apparatus according to claim 1, wherein said control data is configured to postpone the transfer of information from one of the plurality of first stages to the second buffer stage depending on one or more parameters.

9. An apparatus according to claim 8, wherein one of the parameters includes transmission time interval of arrival of data in one of the first buffer stages.

10. A method, comprising:
    detecting first data comprising a filling state of each of a plurality of first buffer stages by a plurality of controllers, wherein each of said controllers is associated with one of the first buffer stages, said first buffer stages receiving and buffering information;
    detecting second data comprising a filling amount of a second buffer stage;
    exchanging by said controllers data regarding the filling state of each of said first buffer stages;
    generating control data using said first data and said second data; and
    transferring said control data to each of said first buffer stages, wherein the control data directs transferring of the buffered information to the second buffer stage, from which the information is transmitted to another network element,
    wherein the control data is configured to control the transferring of the information from said one of the first buffer stages to the second buffer stage so as to avoid overloading the second buffer stage and to minimize an overload of any of the first buffer stages.

11. A method according to claim 10,
    wherein the second buffer stage comprises a plurality of second buffer stages,
    wherein the detecting of the second data comprises cooperating with each of the second buffer stages to detect the filling amount of each of the second buffer stages, and
    wherein said control data is further configured to control the transferring of the information from each of the first buffer stages to each of the second buffer stages so as to avoid the overload of any of the second buffer stages.

12. A method according to claim 10, further comprising:
    scheduling the transferring of the information of the information to the second buffer stage.

13. A method according to claim 10, wherein the information is transmitted as data packets.

14. A method according to claim 10, wherein the information is transmitted from the second buffer stage using an asynchronous transfer mode virtual channel connection which is commonly used by several channels.

15. A method according to claim 14, wherein the channels are comprise asynchronous transfer mode adaptation layer protocol type-two channels.

16. A method according to claim 10, further comprising:
    segmenting information elements in the one of the first buffer stage before the transferring.

17. A method according to claim 10, further comprising:
    postponing the transferring of the information to the second buffer stages depending on one or more parameters.

18. A method according to claim 17, wherein the one or more of the parameters includes transmission time interval of arrival of data in the of the first buffer stages.

19. An apparatus, comprising:
    at least one buffer means for buffering the information, wherein the buffer means comprises a plurality of first buffer stages and a second buffer stage, the information to be transmitted being buffered in the first buffer stages and then transferred to the second buffer stage, from which the information is transmitted to another network element; and
    a plurality of control means, each of said control means associated with one of the first buffer stages for cooperating with the second buffer stage for detecting a filling amount of the second buffer stage, said control means being interconnected for exchanging information regarding an actual or intended transmission of information to the second buffer stage and for transmitting information related to an actual filling state of each of the first buffer stages, and said control means generating control data using said filling amount and said filling states, wherein the first buffer stages are configured to receive the control data controlling a transferring of information from first buffer stages to the second buffer stage so as to avoid overloading of the second buffer stage.

20. An apparatus, comprising:

a receiver configured to receive information;

a buffer configured to store the received information;

a controller configured to detect a filling state of said buffer, to detect a filling amount of a downstream second buffer stage, and to detect a filling state of another first buffer stage configured to receive and transfer data to the second buffer stage and to use the detected filling state of said buffer, the detected filling amount of said downstream second buffer stage, and the detected filling state of said another first buffer stage to form control data; and transferring circuitry configured to receive the control data from the controller and to receive and transfer a portion of said buffered information to the second buffer stage, wherein said control data is configured to control the transfer of the information to the second buffer stage so as to avoid an overload in any of the apparatus, the second buffer, and the another first buffer stage.

21. An apparatus, comprising:

a detector configured to detect first data comprising a filling state of an associated first buffer stage;

a receiver configured to receive second data comprising a filling amount of a second buffer stage and third data comprising filling states of each of other first buffer stages;

a processor configured to assess the first, second, and third data to form control data; and a transmitter configured to send the control data to the associated first buffer stage, wherein said control data is configured to control the transfer of the information from the associated first buffer stage to the second buffer stage so as to avoid an overload in any of the second buffer, the associated first buffer stage, and the other first buffer stages.

* * * * *